(12) United States Patent
Yoshioka

(10) Patent No.: US 12,424,610 B2
(45) Date of Patent: Sep. 23, 2025

(54) SOLID-STATE BATTERY

(71) Applicant: Murata Manufacturing Co., Ltd., Nagaokakyo (JP)

(72) Inventor: Makoto Yoshioka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 619 days.

(21) Appl. No.: 17/481,416

(22) Filed: Sep. 22, 2021

(65) Prior Publication Data

US 2022/0006068 A1 Jan. 6, 2022

Related U.S. Application Data

(63) Continuation of application No. PCT/JP2020/013583, filed on Mar. 26, 2020.

(30) Foreign Application Priority Data

Mar. 29, 2019 (JP) .................................. 2019-068116

(51) Int. Cl.
*H01M 10/0525* (2010.01)
*H01M 4/02* (2006.01)
(Continued)

(52) U.S. Cl.
CPC .......... *H01M 4/13* (2013.01); *H01M 10/0525* (2013.01); *H01M 10/0562* (2013.01);
(Continued)

(58) Field of Classification Search
CPC .. H01M 4/13; H01M 10/058; H01M 10/0525; H01M 10/0562; H01M 50/548;
(Continued)

(56) References Cited

U.S. PATENT DOCUMENTS 6,451,474 B1* 9/2002 Kozu .................. H01M 50/572
429/96
8,034,477 B2 10/2011 Yamada et al.
(Continued)

FOREIGN PATENT DOCUMENTS

JP H10270014 A 10/1998
JP 2003068278 A 3/2003
(Continued)

OTHER PUBLICATIONS

JPH10270014A, Sugiyama, "Sheet electrode and battery using it", machine English translation retrieved from https://worldwide.espacenet.com/ Date: Mar. 5, 2024 (Year: 1998).*
(Continued)

*Primary Examiner* — Matthew T Martin
*Assistant Examiner* — Jared Hansen
(74) *Attorney, Agent, or Firm* — ArentFox Schiff LLP

(57) ABSTRACT

A solid-state battery that includes: a solid battery laminate including a positive electrode layer, a negative electrode layer, and a solid electrolyte layer interposed between the positive electrode layer and the negative electrode layer along a lamination direction; a positive electrode terminal on a first side surface of the solid battery laminate, and the positive electrode layer is in electrical contact with the positive electrode terminal at the first side surface; and a negative electrode terminal on a second side surface of the solid battery laminate, and the negative electrode layer is in electrical contact with the negative electrode terminal at the second side surface, wherein, in a plan view of the solid-state battery, at least one of the positive electrode layer and the negative electrode layer has a tapered portion wherein a dimension thereof decreases toward the first side surface or the second side surface, respectively.

17 Claims, 7 Drawing Sheets

(51) Int. Cl.
*H01M 4/13* (2010.01)
*H01M 10/0562* (2010.01)
*H01M 10/058* (2010.01)
*H01M 50/562* (2021.01)

(52) U.S. Cl.
CPC .... *H01M 10/058* (2013.01); *H01M 2004/025* (2013.01); *H01M 50/562* (2021.01); *H01M 2220/20* (2013.01)

(58) Field of Classification Search
CPC ......... H01M 50/562; H01M 2004/025; H01M 2220/20; Y02E 60/10; Y02P 70/50
See application file for complete search history.

(56) References Cited

U.S. PATENT DOCUMENTS

| | | | |
|---|---|---|---|
| 9,728,343 B2 | 8/2017 | Horikawa et al. | |
| 2007/0042265 A1* | 2/2007 | Tamai | H01M 10/0562 264/618 |
| 2008/0274412 A1 | 11/2008 | Yamada et al. | |
| 2011/0081570 A1* | 4/2011 | Jang | H01M 4/72 429/162 |
| 2014/0106213 A1 | 4/2014 | Horikawa et al. | |
| 2021/0384550 A1* | 12/2021 | Kumagae | H01M 50/533 |
| 2022/0006127 A1* | 1/2022 | Nakano | H01M 10/0562 |
| 2022/0140388 A1* | 5/2022 | Shimizu | H01M 10/0525 429/188 |
| 2022/0140402 A1* | 5/2022 | Tanaka | H01M 4/13 429/209 |

FOREIGN PATENT DOCUMENTS

| | | | |
|---|---|---|---|
| JP | 2009016188 A | | 1/2009 |
| JP | 2009123583 A | | 6/2009 |
| JP | 2009188115 A | | 8/2009 |
| JP | 5050858 B2 | | 10/2012 |
| JP | 2013138155 A | * | 7/2013 |
| JP | 2014120372 A | | 6/2014 |
| JP | 2016207540 A | | 12/2016 |
| JP | 2018185885 A | * | 11/2018 |
| KR | 20170055722 A | | 5/2017 |
| WO | 2013001908 A1 | | 1/2013 |

OTHER PUBLICATIONS

JP2003068278A, Nagayama, "Electrochemical device", machine English translation retrieved from https://worldwide.espacenet.com/ Date: Mar. 5, 2024 (Year: 2003).*
JP2009188115A, Yamada, "Electrical double-layer capacitor", machine English translation retrieved from https://worldwide.espacenet.com/ Date: Mar. 5, 2024 (Year: 2009).*
M. Jafari, et al. "The Review on The Charge Distribution on The Conductor Surface." European Journal of Physics Education 4.3 (2013) (Year: 2013).*
JP2013138155a, Suetomi, et al. "Laminate type storage element and method for manufacturing the same", machine English translation retrieved from https://worldwide.espacenet.com/ Date: Mar. 26, 2025 (Year: 2013).*
JP2018185885A, Tsubouchi, et al. "Laminate type secondary battery", machine English translation retrieved from https://worldwide.espacenet.com/ Date: Jul. 9, 2025 (Year: 2018).*
International Search Report issued in PCT/JP2020/013583, dated Jun. 16, 2020.
Written Opinion of International Search Report issued in PCT/JP2020/013583, dated Jun. 16, 2020.

* cited by examiner

SOLID-STATE BATTERY

CROSS REFERENCE TO RELATED APPLICATIONS

The present application is a continuation of International application No. PCT/JP2020/013583, filed Mar. 26, 2020, which claims priority to Japanese Patent Application No. 2019-068116, filed Mar. 29, 2019, the entire contents of each of which are incorporated herein by reference.

FIELD OF THE INVENTION

The present invention relates to a solid-state battery.

BACKGROUND OF THE INVENTION

Conventionally, secondary batteries that can be repeatedly charged and discharged have been used for various purposes. For example, secondary batteries are used as a power source of an electronic device such as a smartphone and a notebook computer.

In a secondary battery, a liquid electrolyte is generally used as a medium for ion transfer that contributes to charge and discharge. That is, a so-called electrolytic solution is used for the secondary battery. However, in such a secondary battery, safety is generally required from the viewpoint of preventing leakage of an electrolytic solution. In addition, an organic solvent or the like used for the electrolytic solution is a flammable substance, and therefore safety is also required in that viewpoint.

Therefore, a solid-state battery with a solid electrolyte instead of an electrolytic solution has been investigated.

Patent Document 1: Japanese Patent Application Laid-Open No. 2016-207540

SUMMARY OF THE INVENTION

Necessary measures against moisture in the air needs to be surely taken for the solid-state battery. This is because when moisture enters the inside of the solid-state battery, side reactions other than a battery reaction may occur in the solid-state battery constituent members (for example, an electrode layer), leading to deterioration of battery characteristics.

The inventor of the present application has noticed that there is still a problem to be overcome in the previously proposed solid-state battery, and has found a need to take measures therefor. Specifically, the inventor of the present application has found that there are the following problems.

The solid-state battery includes a solid battery laminate including a positive electrode layer, a negative electrode layer, and a solid electrolyte layer therebetween (refer to Patent Document 1). For example, as shown in FIGS. 8(A) and 8(B), in solid battery laminate 500', positive electrode layer 10A, solid electrolyte layer 20, and negative electrode layer 10B are laminated in this order. The solid battery laminate 500' is provided with positive electrode terminal 30A and negative electrode terminal 30B that are external terminals in contact with two opposing side surfaces (that is, positive electrode side end surface 500'A and negative electrode side end surface 500'B). Herein, in a conventional solid-state battery, the positive electrode layer and the negative electrode layer generally have a substantially rectangular shape in a plan view.

In such a solid-state battery, moisture may enter the solid battery laminate from the vicinity of the boundary between the solid battery laminate and the external terminal (particularly, a corner portion of the solid battery laminate). In the solid battery laminate, when such a separation distance between the entry site of moisture and the electrode layer is not sufficient, the entering moisture easily reaches the electrode layer, and an undesirable side reaction occurs in the electrode layer, which may cause deterioration of battery characteristics.

The present invention has been made in view of such problems. That is, a main object of the present invention is to provide a solid-state battery that reduces generation of undesirable side reactions and more preferably prevents deterioration of battery performance when moisture enters the solid battery laminate.

The inventor of the present application has tried to solve the above problems by addressing in a new direction instead of addressing in an extension of the prior art. As a result, the present inventor has reached the invention of a solid-state battery in which the above main object has been achieved.

In the present invention, there is provided a solid-state battery comprising: a solid battery laminate including at least one battery constituent unit including a positive electrode layer, a negative electrode layer, and a solid electrolyte layer interposed between the positive electrode layer and the negative electrode layer along a lamination direction; a positive electrode terminal on a first side surface of the solid battery laminate, and the positive electrode layer is in electrical contact with the positive electrode terminal at the first side surface; and a negative electrode terminal on a second side surface of the solid battery laminate, and the negative electrode layer is in electrical contact with the negative electrode terminal at the second side surface, wherein, in a plan view of the solid-state battery, at least one of the positive electrode layer and the negative electrode layer has a tapered portion where a dimension thereof decreases toward the first side surface or the second side surface, respectively.

The solid-state battery according to the present invention is a solid-state battery that reduces generation of undesirable side reactions and more preferably prevents deterioration of battery performance when moisture enters the solid battery laminate.

DETAILED DESCRIPTION OF THE INVENTION

Figure 1:
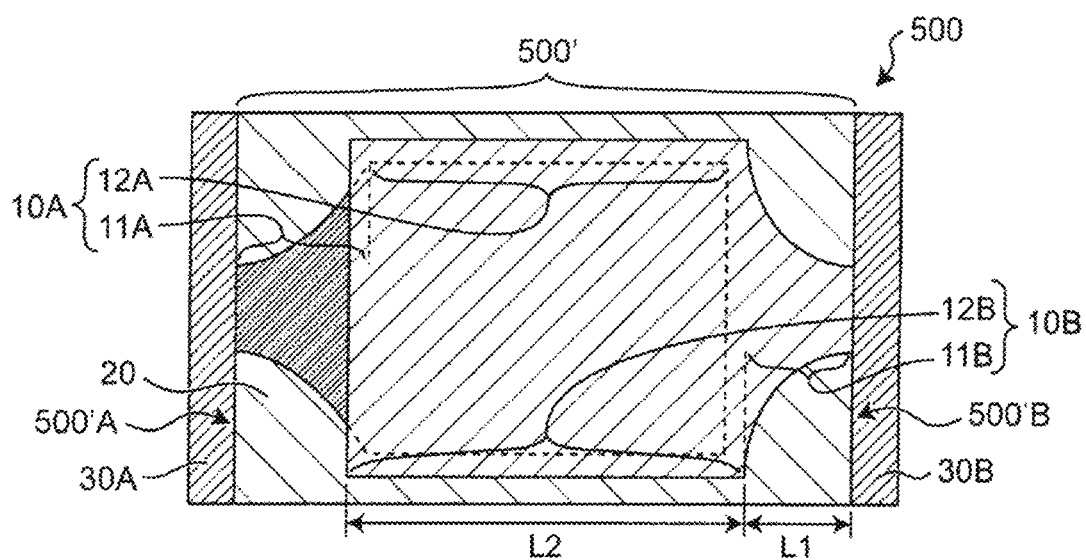
FIG. 1 is a plan view schematically showing one embodiment of a solid-state battery according to the present invention.

Hereinafter, the "solid-state battery" of the present invention will be described in detail. The description will be made with reference to the drawings as necessary; however, the illustrated contents are only schematically and exemplarily illustrated for the understanding of the present invention, and the appearance and the dimensional ratio for example may be different from the actual ones.

The term "solid-state battery" used in the present invention refers to a battery whose constituent elements are composed of a solid in a broad sense, and refers to an all-solid-state battery whose constituent elements (particularly preferably all constituent elements) are composed of a solid in a narrow sense. In a preferable aspect, the solid-state battery in the present invention is a laminated solid-state battery composed of each layer comprising a battery constituent unit laminated with each other, and such each layer preferably comprises a sintered body. The "solid-state battery" includes not only a so-called "secondary battery" capable of repeating charging and discharging but also a "primary battery" capable of only discharging. In a preferable aspect of the present invention, the "solid-state battery" is a secondary battery. The "secondary battery" is not excessively limited by its name, and may include, for example, a power storage device.

The term "plan view" as used herein is based on a form in a case where an object is viewed from the upper side or the lower side along the thickness direction based on the laminating direction of each layer constituting the solid-state battery. In addition, the term "sectional view " as used herein is based on a form (briefly, a form in the case of being cut along a plane parallel to the thickness direction) where an object is viewed from a direction substantially perpendicular to a thickness direction based on a laminating direction of each layer constituting the solid-state battery.

Basic Configuration of Solid-State Battery

A solid-state battery comprises a solid battery laminate including at least one battery constituent unit comprising a positive electrode layer, a negative electrode layer, and a solid electrolyte layer interposed therebetween along a lamination direction.

In the solid-state battery, each layer constituting the solid-state battery is formed by fire, and a positive electrode layer, a negative electrode layer, and a solid electrolyte layer comprise a sintered layer. Preferably, the positive electrode layer, the negative electrode layer, and the solid electrolyte are fired integrally with each other, and therefore the battery constituent unit comprises an integrally sintered body.

The positive electrode layer is an electrode layer comprising at least a positive electrode active material. The positive electrode layer may further comprise a solid electrolyte and/or a positive electrode collector layer. In a preferable aspect, the positive electrode layer is composed of a sintered body including at least a positive electrode active material, solid electrolyte particles, and a positive electrode collector layer. Whereas, the negative electrode layer is an electrode layer comprising at least a negative electrode active material. The negative electrode layer may further comprise a solid electrolyte and/or a negative electrode collector layer. In a preferable aspect, the negative electrode layer is composed of a sintered body including at least a negative electrode active material, solid electrolyte particles, and a negative electrode collector layer.

The positive electrode active material and the negative electrode active material are materials involved in the transfer of electrons in the solid-state battery. There are performed ion movement (conduction) between the positive electrode layer and the negative electrode layer with the solid electrolyte interposed therebetween and electron transfer between the positive electrode layer and the negative electrode layer through external circuit, whereby charging and discharging are performed. The positive electrode layer and the negative electrode layer are particularly preferably layers capable of occluding and releasing lithium ions or sodium ions. That is, preferable is the all-solid-state secondary battery in which lithium ions move between the positive electrode layer and the negative electrode layer with the solid electrolyte interposed therebetween to charge and discharge the battery.

(Positive Electrode Active Material)

A positive electrode active material included in the positive electrode layer is, for example, a lithium-containing compound. The type of the lithium compound is not particularly limited, and is, for example, a lithium transition metal composite oxide and a lithium transition metal phosphate compound. The lithium transition metal composite oxide is a generic term for oxides including lithium and one or more transition metal elements as constituent elements, and the lithium transition metal phosphate compound is a generic term for phosphate compounds including lithium and one or more transition metal elements as constituent elements. The type of the transition metal element is not particularly limited, and examples thereof include cobalt (Co), nickel (Ni), manganese (Mn), and iron (Fe).

The lithium transition metal composite oxide is, for example, a compound represented by each of $Li_xM1O_2$ and $Li_yM2O_4$. The lithium transition metal phosphate compound is, for example, a compound represented by $Li_zM3PO_4$. However, each of M1, M2, and M3 is one or two or more of transition metal elements. The respective values of x, y, and z are arbitrary.

Specifically, the lithium transition metal composite oxide is, for example, $LiCoO_2$, $LiNiO_2$, $LiVO_2$, $LiCrO_2$, and $LiMn_2O_4$. The lithium transition metal phosphate compound include, for example, $LiFePO_4$ and $LiCoPO_4$.

When the positive electrode layer is a layer capable of occluding and releasing sodium ions, examples of the positive electrode active material include at least one selected from the group consisting of a sodium-containing phosphate compound having a NASICON-type structure, a sodium-containing phosphate compound having an olivine-type structure, a sodium-containing layered oxide, and a sodium-containing oxide having a spinel-type structure.

Negative Electrode Active Material

Examples of the negative electrode active material included in the negative electrode layer include a carbon material, a metal-based material, a lithium alloy, and a lithium-containing compound.

Specifically, the carbon material is, for example, graphite, graphitizable carbon, non-graphitizable carbon, mesocarbon microbeads (MCMB), and highly oriented graphite (HOPG).

The metal-based material is a generic term for materials including, as constituent elements, any one or two or more of metal elements and metalloid elements capable of forming an alloy with lithium. This metal-based material may be a simple substance, an alloy, or a compound. The purity of the simple substance described herein is not necessarily limited to 100%, and therefore the simple substance may include a trace amount of impurities.

Examples of the metal element and metalloid element include silicon (Si), tin (Sn), aluminum (Al), indium (In), magnesium (Mg), boron (B), gallium (Ga), germanium (Ge), lead (Pb), bismuth (Bi), cadmium (Cd), titanium (Ti), chromium (Cr), iron (Fe), niobium (Nb), molybdenum (Mo), silver (Ag), zinc (Zn), hafnium (Hf), zirconium (Zr), yttrium (Y), palladium (Pd), and platinum (Pt).

Specifically, the metal-based material is, for example, Si, Sn, $SiB_4$, $TiSi_2$, SiC, $Si_3N_4$, $SiO_v$ ($0<v\leq 2$), LiSiO, $SnO_w$ ($0<w\leq 2$), $SnSiO_3$, LiSnO, and $Mg_2Sn$.

The lithium-containing compound is, for example, a lithium transition metal composite oxide. The definition of the lithium transition metal composite oxide is as described above. Specifically, the lithium transition metal composite oxide is, for example, $Li_3V_2(PO_4)_3$, $Li_3Fe_2(PO4)_3$, $LiTi_2(PO_4)_3$, $LiCuPO_4$, and $Li_4Ti_5O_{12}$.

In addition, when the negative electrode layer is a layer capable of occluding and releasing sodium ions, examples of the negative electrode active material capable of occluding and releasing sodium ions include at least one selected from the group consisting of a sodium-containing phosphate compound having a NASICON-type structure, a sodium-containing phosphate compound having an olivine-type structure, and a sodium-containing oxide having a spinel-type structure.

The positive electrode layer and/or the negative electrode layer may include a conductive auxiliary agent. Examples of the conductive auxiliary agent included in the positive electrode layer and/or the negative electrode layer include a carbon material and a metal material. Specifically, the carbon material is, for example, graphite and carbon nanotube. The metal material is, for example, copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and palladium (Pd), and may be an alloy of two or more thereof.

In addition, the positive electrode layer and/or the negative electrode layer may include a binder. The binder is, for example, any one or two or more of synthetic rubber and polymer material. Specifically, the synthetic rubber is, for example, styrene butadiene-based rubber, fluorine-based rubber, and ethylene propylene diene. Examples of the polymer material include at least one selected from the group consisting of polyvinylidene fluoride, polyimide, and acrylic resin.

Furthermore, the positive electrode layer and/or the negative electrode layer may include a sintering aid. Examples of the sintering aid include at least one selected from the group consisting of lithium oxide, sodium oxide, potassium oxide, boron oxide, silicon oxide, bismuth oxide, and phosphorus oxide.

The thicknesses of the positive electrode layer and the negative electrode layer are not particularly limited, and may each independently be, for example, 2 μm to 100 μm, particularly 5 μm to 50 μm.

Solid Electrolyte

The solid electrolyte comprises a battery constituent unit in the solid-state battery, and comprises a layer in which lithium ions or sodium ions can conduct between the positive electrode layer and the negative electrode layer. The solid electrolyte may be provided at least between the positive electrode layer and the negative electrode layer. That is, the solid electrolyte may also exist around the positive electrode layer and/or the negative electrode layer so as to protrude from between the positive electrode layer and the negative electrode layer. Specific solid electrolytes include, for example, any one or two or more of crystalline solid electrolytes and glass ceramic-based solid electrolytes.

The crystalline solid electrolyte is a crystalline electrolyte. Specifically, the crystalline solid electrolyte is, for example, an inorganic material and a polymer material, and the inorganic material is, for example, a sulfide and an oxide. Examples of the sulfide include $Li_2S-P_2S_5$, $Li_2S-SiS_2-Li_3PO_4$, $Li_7P_3S_{11}$, $Li_{3.25}Ge_{0.25}P_{0.75}S$, and $Li_{10}GeP_2S_{12}$. Examples of the oxide include $Li_xM_y(PO_4)_3$ ($1\leq x\leq 2$, $1\leq y\leq 2$, and M is at least one selected from the group consisting of Ti, Ge, Al, Ga, and Zr.), $Li_7La_3Zr_2O_{12}$, $Li_{6.75}La_3Zr_{1.75}Nb_{0.25}O_{12}$, $Li_6BaLa_2Ta_2O_{12}$, $Li_{1+x}Al_xTi_{2-x}(PO_4)_3$, $La_{2/3-x}Li_{3x}TiO_3$, $Li_{1.2}Al_{0.2}Ti_{1.8}(PO_4)_3$, $La_{0.55}Li_{0.35}TiO_3$, and $Li_7La_3Zr_2O_{12}$. The polymer material is, for example, polyethylene oxide (PEO).

The glass ceramic-based solid electrolyte is an electrolyte in which amorphous and crystalline are mixed. This glass ceramic-based solid electrolyte is, for example, an oxide including lithium (Li), silicon (Si), and boron (B) as constituent elements, and more specifically includes lithium oxide ($Li_2O$), silicon oxide ($SiO_2$), and boron oxide ($B_2O_3$). The ratio of the content of lithium oxide to the total content of lithium oxide, silicon oxide, and boron oxide is not particularly limited, and is, for example, 40 mol % to 73 mol %. The ratio of the content of silicon oxide to the total content of lithium oxide, silicon oxide, and boron oxide is not particularly limited, and is, for example, 8 mol % to 40 mol %. The ratio of the content of boron oxide to the total content of lithium oxide, silicon oxide, and boron oxide is not particularly limited, and is, for example, 10 mol % to 50 mol %. In order to measure the content of each of lithium oxide, silicon oxide, and boron oxide, a glass ceramic-based solid electrolyte is analyzed by using, for example, inductively coupled plasma atomic emission spectrometry (ICP-AES).

When the solid electrolyte comprises a layer capable of conducting sodium ions, examples of the solid electrolyte include a sodium-containing phosphate compound having a NaSICON structure, an oxide having a perovskite structure, and an oxide having a garnet-type or garnet-type similar structure. Examples of the sodium-containing phosphate compound having a NaSICON structure include $Na_xM_y(PO_4)_3$ ($1\leq x\leq 2$, $1\leq y\leq 2$, and M is at least one selected from the group consisting of Ti, Ge, Al, Ga, and Zr.).

The solid electrolyte layer may include a binder and/or a sintering aid. The binder and/or the sintering aid included in the solid electrolyte layer may be selected from, for example, materials similar to the binder and/or the sintering aid that may be included in the positive electrode layer and/or the negative electrode layer.

The thickness of the solid electrolyte layer is not particularly limited, and may be, for example, 1 μm to 15 μm, particularly 1 μm to 5 μm.

Positive Electrode Current Collector Layer/Negative Electrode Current Collector Layer As the positive electrode current collector material constituting the positive electrode current collector layer and the negative electrode current collector material constituting the negative electrode current collector layer, it is preferable to use a material having a high electrical conductivity, and for example, it is preferable to use at least one selected from the group consisting of a carbon material, silver, palladium, gold, platinum, aluminum, copper, and nickel. Each of the positive electrode collector layer and the negative electrode collector layer may have an electrical connection portion for being electrically connected to the outside, and may be configured to be electrically connectable to the terminal. Each of the positive electrode collector layer and the negative electrode collector layer may have a form of a foil; however, it is preferable to have a form of integral sintering from the viewpoint of improving electron conductivity by integral sintering and reducing manufacturing cost. When the positive electrode current collector layer and the negative electrode current collector layer have the form of a sintered body, for example, the positive electrode current collector layer and the negative electrode current collector layer may be composed of a sintered body including a conductive auxiliary agent, a binder, and/or a sintering aid. The conductive auxiliary agent included in the positive electrode collector layer and the negative electrode collector layer may be selected from, for example, the similar material as the conductive auxiliary agent that can be included in the positive electrode layer and/or the negative electrode layer. The binder and/or the sintering aid included in the positive electrode collector layer and the negative electrode collector layer may be selected from, for example, the similar material as the binder and/or the sintering aid that can be included in the positive electrode layer and/or the negative electrode layer.

The thicknesses of the positive electrode collector layer and the negative electrode collector layer are not particularly limited, and may each independently be, for example, 1μm to 10 μm, particularly 1 μm to 5 μm.

Insulating Layer

The insulating layer refers to a material that does not conduct electricity in a broad sense, that is, a layer composed of a non-conductive material, and refers to a layer composed of an insulating material in a narrow sense. Although not particularly limited, the insulating layer may be composed of, for example, a glass material and a ceramic material. For example, a glass material may be selected as the insulating layer. Although not particularly limited, examples of the glass material may include at least one selected from the group consisting of soda lime glass, potash glass, borate glass, borosilicate glass, barium borosilicate glass, boric acid subsalt glass, barium borate glass, bismuth borosilicate salt glass, bismuth borate zinc glass, bismuth silicate glass, phosphate glass, alminophosphate glass, and phosphate subsalt glass. In addition, although not particularly limited, examples of the ceramic material include at least one selected from the group consisting of aluminum oxide ($Al_2O_3$), boron nitride (BN), silicon dioxide ($SiO_2$), silicon nitride ($Si_3N_4$), zirconium oxide ($ZrO_2$), aluminum nitride (AlN), silicon carbide (SiC), and barium titanate ($BaTiO_3$).

Protective Layer

The protective layer may be generally formed on the outermost side of the solid-state battery, and is a layer for electrical, physical, and/or chemical protection. The material constituting the protective layer is preferably excellent in insulation property, durability and/or moisture resistance, and environmentally safe. For example, it is preferable to use glass, ceramics, a thermosetting resin, and/or a photocurable resin.

External Terminal

The solid-state battery is generally provided with an external terminal. Particularly, the terminals of the positive and negative electrodes are provided so as to form a pair on the side surfaces of the solid-state battery. More specifically, the terminal on the positive electrode side connected to the positive electrode layer and the terminal on the negative electrode side connected to the negative electrode layer are provided so as to form a pair. As such a terminal, it is preferable to use a material having high conductivity. The material of the terminal is not particularly limited; however, may be at least one selected from the group consisting of silver, gold, platinum, aluminum, copper, tin, and nickel.

Features of Solid-State Battery of the Present Invention

The solid-state battery of the present invention comprises a solid battery laminate body including at least one battery constituent unit along a lamination direction, the battery constituent unit including a positive electrode layer, a negative electrode layer, and a solid electrolyte layer interposed between the positive electrode layer and the negative electrode layer, and has a feature where a shape of an electrode layer (that is, the positive electrode layer and the negative electrode layer) is modified at a respective side surface of the solid battery laminate having a positive electrode terminal and a negative electrode terminal.

Figure 8A:
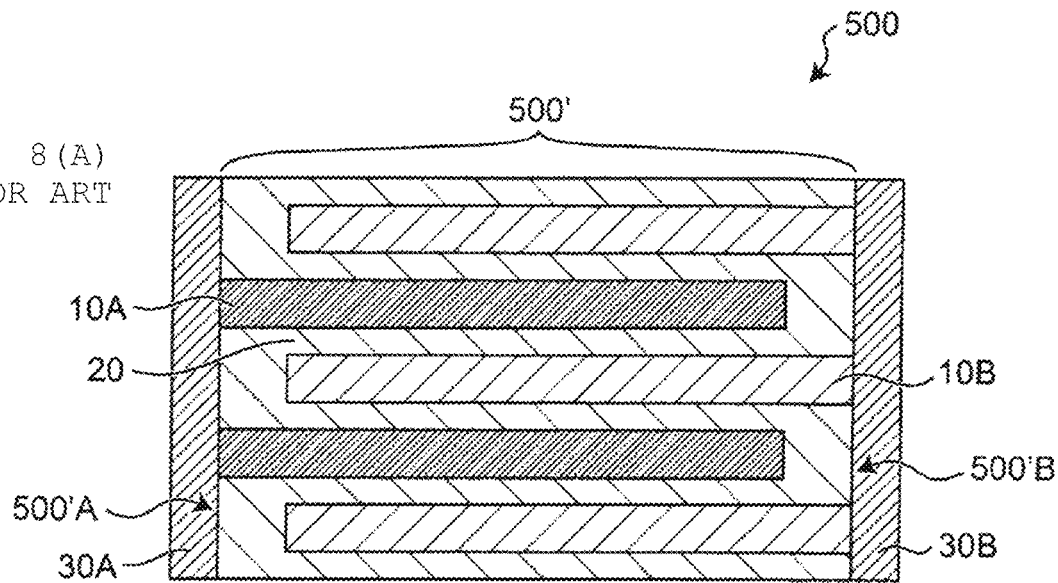
FIGS. 8(A) and 8(B) are schematic views (sectional view and plan view) of a conventional solid-state battery.
Figure 8B:
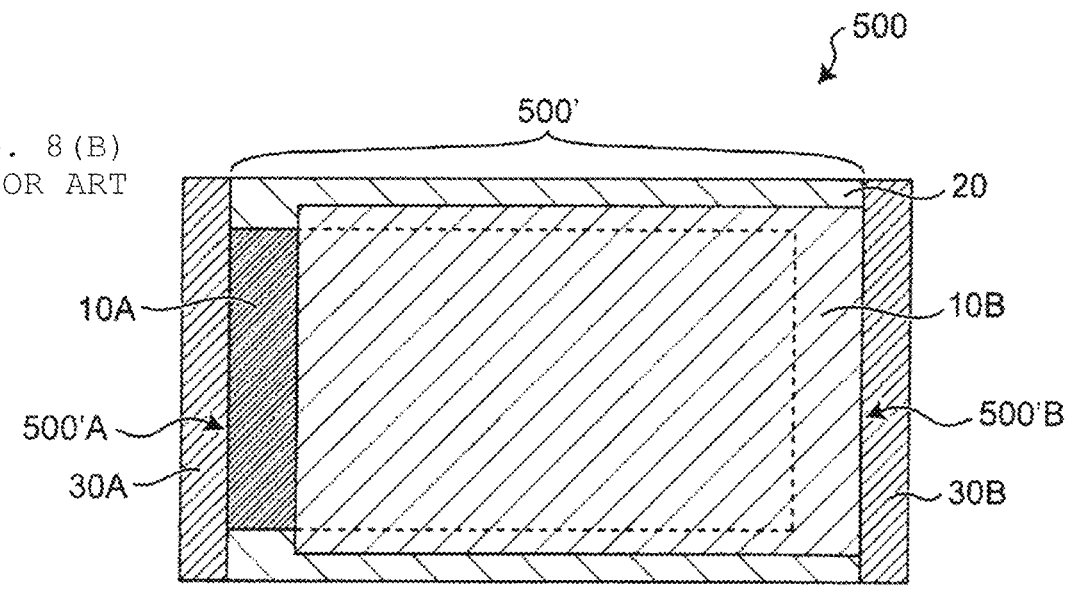

More specifically, in a plan view of the solid-state battery, at least one of the positive electrode layer and the negative electrode layer has a tapered shape in which a dimension thereof decreases toward a side surface in contact with the positive or negative external terminal. In other words, as compared with the conventional solid-state battery (refer to FIGS. 8(A) and 8(B)), at least one of the positive or negative electrode layers has a shape in which a corner portion of the electrode layer on a side in contact with the external terminal is missing.

In the exemplary aspect shown in FIG. 1, positive electrode layer 10A, solid electrolyte layer 20, and negative electrode layer 10B are provided in this order in a plan view of solid battery laminate 500'. Solid battery laminate 500' is provided with positive electrode terminal 30A and negative electrode terminal 30B so as to be in contact with two opposing side surfaces (that is, positive electrode side end surface 500'A and negative electrode side end surface 500'B).

The positive electrode layer 10A and the negative electrode layer 10B are provided so as to be joined to each terminal at the positive electrode side end surface 500'A and the negative electrode side end surface 500'B. Positive electrode layer 10A comprises positive electrode tapered portion 11A whose dimension decreases toward positive electrode side end surface 500'A, and positive electrode non-tapered portion 12A serving as a main surface portion of the positive electrode layer that is a portion other than positive electrode tapered portion 11A. In addition, negative electrode layer 10B comprises negative electrode tapered portion 11B that is a portion whose dimension decreases toward negative electrode side end surface 500'B, and negative electrode non-tapered portion 12B serving as a main surface portion of the negative electrode layer that is a portion other than negative electrode tapered portion 11B. For example, the ratio (L1/L2) of the tapered portion length (L1) to the non-tapered portion length (L2) in a plan view is 0.01 to 1.0. Herein, positive electrode tapered portion 11A and negative electrode tapered portion 11B are electrically connected to positive electrode terminal 30A and negative electrode terminal 30B, respectively. The non-tapered portion serving as the main surface portion of each of the electrode layers may have a substantially rectangular shape in a plan view.

According to the above configuration, at least one of the electrode layers has a tapered shape in which the dimension decreases toward the side surface in contact with the external terminal, and thus the separation distance between the corner portion of the solid battery laminate into which moisture in the air particularly easily enters and the electrode layer can be increased as compared with the case where the planar shape of the electrode layer is a substantially rectangular shape. That is, as compared with the case where the planar shape of the electrode layer is a substantially rectangular shape, the contact portion between the electrode layer and the external terminal can be relatively reduced.

In addition, battery constituent materials such as a solid electrolyte, an insulating material, and a current collecting material exist between the tapered portion of the electrode layer and the external terminal, and water molecules have a movement resistance against the battery constituent materials, and therefore a substantial movement distance can be further increased. Accordingly, when moisture enters the solid battery laminate, occurrence of an undesirable side reaction in the electrode layer can be reduced. Therefore, deterioration of battery performance of the solid-state battery can be more preferably prevented, and long-term reliability of the solid-state battery can be improved.

The "tapered shape in which the dimension of the electrode layer decreases toward the side surface in contact with the external terminal" as used herein refers to a shape in which the width dimension of at least a portion in contact with the external terminal is smaller than the width dimension of the other portion in a plan view of the same electrode layer. In other words, the shape refers to a shape of the electrode layer in which the corner portion on the side in contact with the external terminal in a plan view is missing. Herein, the term "shape in which a corner portion is missing" means a shape obtained by cutting out a corner portion shape (for example, a substantially right-angle shape) on a side not in contact with the external electrode in a plan view of the same electrode layer.

Figure 2A:
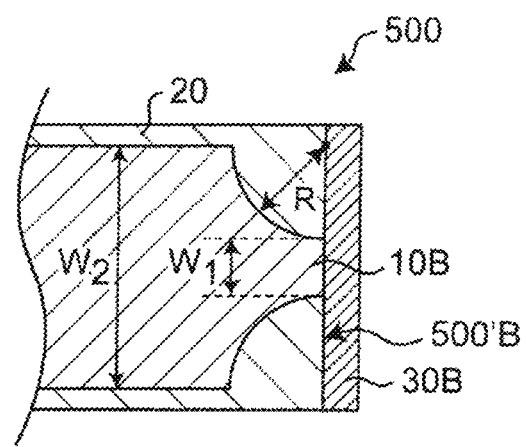
FIGS. 2(A) and 2(B) are plan views schematically showing one embodiment in which an electrode layer in the solid-state battery according to the present invention has a tapered shape.
Figure 2B:
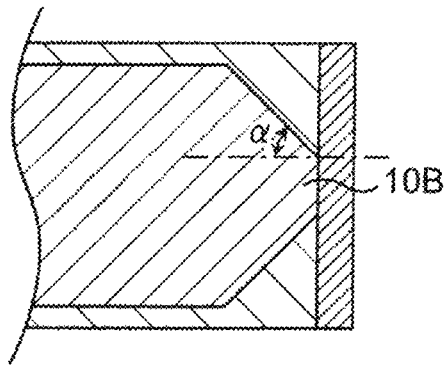

As a specific tapered shape, in a plan view of the solid-state battery, a curved shape may be formed such that a width dimension is tapered toward a side surface in contact with the external terminal (refer to FIG. 2(A)), or a linear shape may be formed (refer to FIG. 2(B)), and the curved shape and the linear shape may be mixed in a portion having the same tapered shape. From the viewpoint that the separation distance between the external terminal and the electrode layer can be further increased, the tapered shape is preferably a curved shape in a plan view of the solid-state battery.

Figure 3A:
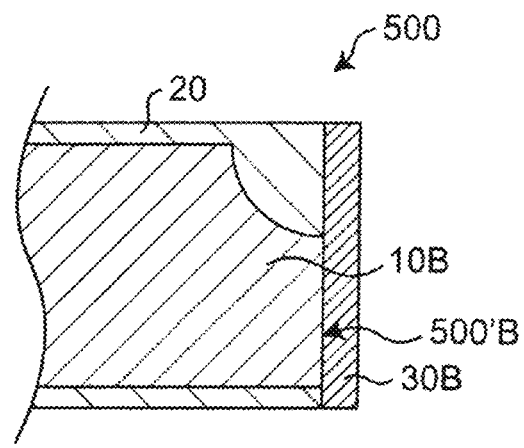
FIGS. 3(A) to 3(C) are plan views schematically showing another embodiment in which an electrode layer in the solid-state battery according to the present invention has a tapered shape.

In a plan view of the solid-state battery, the tapered shape may be formed so as to be substantially symmetrical in the width direction (refer to FIG. 2(A)), or may be formed only at one of the ends in the width direction (refer to FIG. 3(A)).

From the viewpoints that the separation distance between the external terminal and the electrode layer can be further increased and the structural stability in the solid-state state battery can be improved, the tapered shape is preferably formed so as to be substantially symmetrical in the width direction in a plan view of the solid-state battery.

Figure 3B:
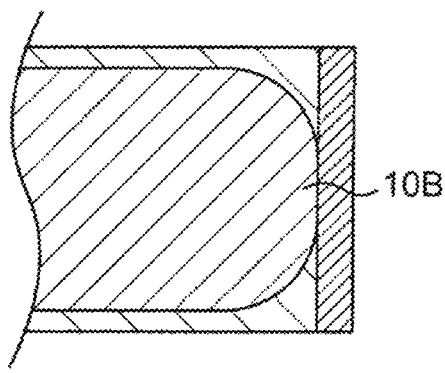

When the tapered shape is a curved shape, the tapered shape may be a random curved shape or a regular curved shape. The regular curved shape may be, for example, an arc shape curved inward (that is, a concave arc shape) (refer to FIG. 2(A)) or an arc shape curved outward (that is, a convex arc shape) (refer to FIG. 3(B)). The "arc shape" may be an arc in a true circle or an arc in an ellipse.

In one embodiment, the tapered shape is an arc shape curved inward. With such a configuration, the separation distance between the electrode layer and the corner portion of the solid battery laminate can be further increased. In addition, in the electrode layer in the vicinity of the external terminal, electron conduction in a plan view of the solid-state battery can be more uniform, and the reaction in the electrode layer can be more effectively made uniform. In the above embodiment, the curvature radius R of the arc shape curved inward is preferably 25 μm to 10000 μm (refer to FIG. 2(A)). Setting the curvature radius of the arc shape curved inward within the above range can more effectively separate the electrode layer and the corner portion of the solid battery laminate from each other while making the flow of electrons in the electrode layer more uniform.

Figure 3C:
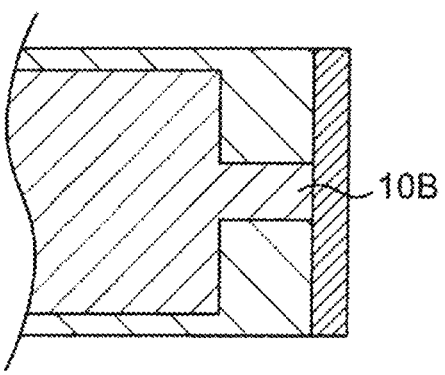

When the tapered shape is formed in a linear shape, the tapered shape may be formed in a linear shape such that the width dimension gradually tapers toward the side surface in contact with the external terminal (refer to FIG. 2(B)), or may be formed in a linear shape such that the width dimension tapers stepwise (refer to FIG. 3(C)).

In one embodiment, the tapered shape is formed in a linear shape. With such a configuration, it is possible to enhance the structural stability against stress that may occur in the electrode layer in manufacturing or using the solid-state battery. In the above embodiment, the taper angle α in the tapered shape is 40 degrees to 80 degrees, more preferably 40 degrees to 65 degrees (refer to FIG. 2(B)). Setting the taper angle in the tapered shape within the above range can more effectively separate the electrode layer and the corner portion of the solid battery laminate from each other while further improving the structural stability in the electrode layer.

In one embodiment, in a plan view of the electrode layer, a dimensional ratio of width dimension $W_1$ of the contact portion with the external terminal to width dimension $W_2$ of a portion other than the tapered portion (that is, the non-tapered portion) is 0.3 to 0.9 (refer to FIG. 2(A)). When the dimensional ratio is 0.3 or more, the flow of electrons in the electrode layer in the width direction can be more uniform, and the structural stability in the electrode layer can be further enhanced. In addition, when the dimensional ratio is 0.9 or less, the electrode layer and the corner portion of the solid battery laminate can be more effectively separated from each other. Preferably, the dimensional ratio is 0.5 to 0.8.

Figure 4A:
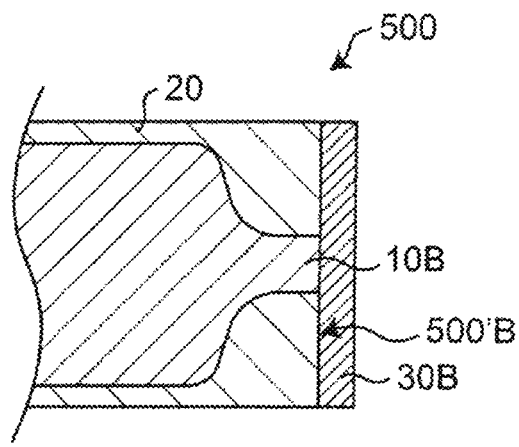
FIGS. 4(A) and 4(B) are plan views schematically showing another embodiment in which an electrode layer in the solid-state battery according to the present invention has a tapered shape.
Figure 4B:
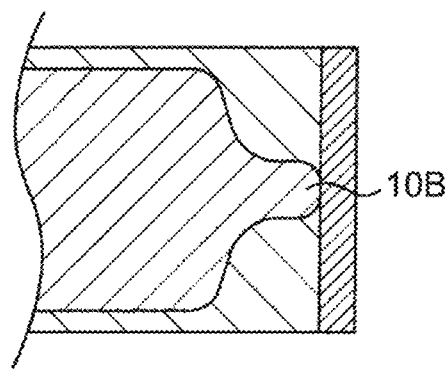

In one embodiment, in the electrode layer, there is a rounded contour between a portion having a tapered shape (that is, the tapered portion) and a non-tapered portion to be a main surface portion of the electrode layer (refer to FIG. 4(A)). In other words, the shape of the corner portion in the tapered portion has a convex arc shape curved outward. With such a configuration, electron conduction in the electrode layer can be more uniform, and the reaction in the electrode layer can be more effectively made uniform. In the above embodiment, the radius of curvature of the contour is preferably 25 μm to 10000 μm. Setting the radius of curvature within the above range can make the flow of electrons in the electrode layer more uniform while maintaining a desired amount of the electrode active material. Similarly, the contour of the joint portion with the external terminal in the electrode layer may be rounded (refer to FIG. 4(B)).

In one embodiment, in a sectional view of the solid-state battery, at least a part of the tapered portion in the electrode layer (that is, the positive electrode layer or the negative electrode layer) is a non-opposing portion that does not directly oppose the different electrode layer (that is, the negative electrode layer against the positive electrode layer or the positive electrode layer against the negative electrode layer) adjacent to the electrode layer in the lamination direction. In an example aspect shown in FIG. 1, positive electrode layer 10A comprises positive electrode tapered portion 11A and positive electrode non-tapered portion 12A, and negative electrode layer 10B comprises negative electrode tapered portion 11B and negative electrode non-tapered portion 12B. Herein, a part of positive electrode tapered portion 11A is a non-opposing portion that does not directly oppose negative electrode layer 10B adjacent in the lamination direction, and negative electrode tapered portion 11B is a non-opposing portion that does not directly oppose positive electrode layer 10A adjacent in the lamination direction. In other words, positive electrode tapered portion 11A has a portion where at least negative electrode layer 10B directly opposing in the lamination direction does not exist, and negative electrode tapered portion 11B does not have positive electrode layer 10A directly opposing in the lamination direction.

With the above configuration, it is possible to reduce a portion having a long distance between opposing electrode layers. Therefore, the distance between the opposing electrode layers in the same electrode layer becomes more uniform, and the balance of the charge-discharge reaction is improved in the electrode layer. Therefore, the charge-discharge efficiency of the solid-state battery can be improved, and the cycle characteristics and the input/output characteristics can be improved.

The tapered shape may be formed on any one of the positive electrode layer and the negative electrode layer, or may be formed on both the positive electrode layer and the negative electrode layer. The tapered shape is preferably formed on both the positive electrode layer and the negative electrode layer from the viewpoint of further enhancing the structural stability and improving the handleability (refer to FIG. 1).

Figure 5:
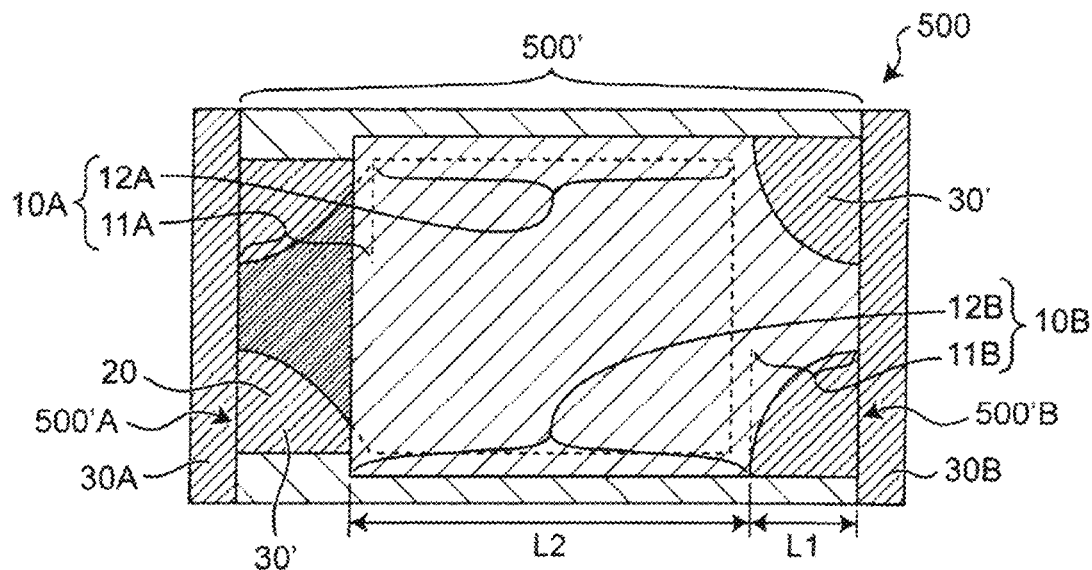
FIG. 5 is a plan view schematically showing one embodiment of a solid-state battery according to the present invention.

A solid electrolyte, an insulating material, and a current collector material may be provided between the tapered portion of the electrode layer and the external terminal, and the same material as the external terminal may be provided. In one embodiment, the same material as the external terminal is provided between the tapered portion of the electrode layer and the external terminal. In other words, the same material as the external terminal is provided between the tapered contour of the electrode layer and the inner contour of the external terminal. With such a configuration, it is possible to improve bondability between the electrode layer and the external terminal and to further prevent entry of moisture. In an example aspect shown in FIG. 5, in a plan view of solid-state battery 500, external terminal material 30' is provided between positive electrode tapered portion 11A and positive electrode terminal 30A, and external terminal material 30' is provided between negative electrode tapered portion 11B and negative electrode terminal 30B.

In one embodiment, at least one electrode layer consists of an electrode active material layer and a current collector layer. With such a configuration, higher conductivity can be imparted to the electrode layer. This makes it possible to enhance the cycle characteristics and input/output characteristics of the solid-state battery. When the electrode layer comprises the electrode active material layer and the current collector layer, only the electrode active material layer may have a tapered shape, and both the electrode active material layer and the current collector layer may have a tapered shape.

Figure 6:
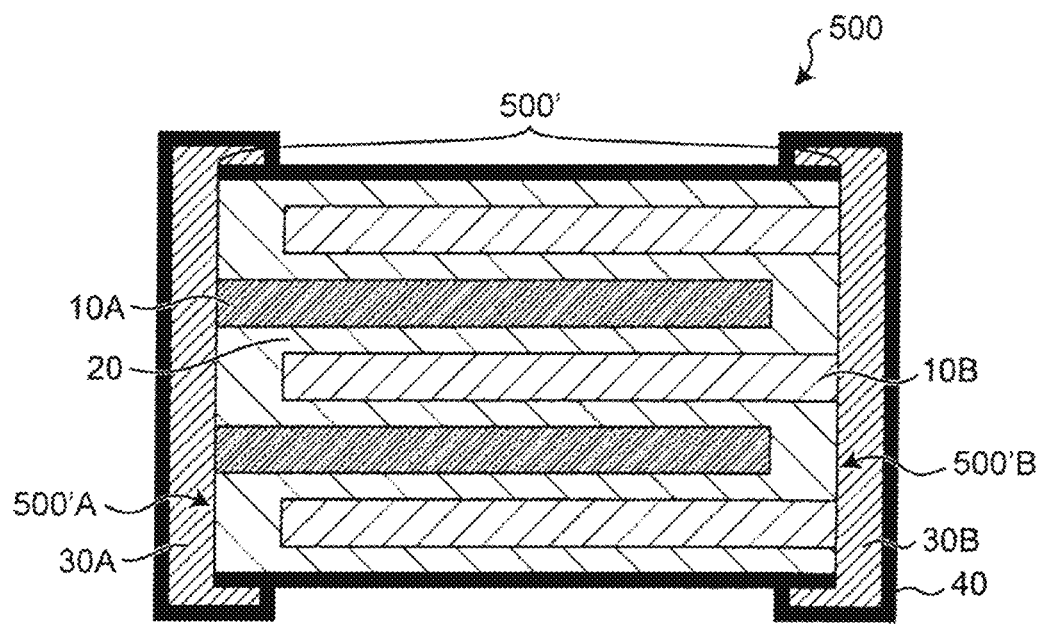
FIG. 6 is a sectional view schematically showing one embodiment of a solid-state battery according to the present invention.

In a preferable aspect, the solid-state battery may further include a protective layer. As shown in FIG. 6, protective layer 40 may be provided outside solid battery laminate body 500', positive electrode terminal 30A, and negative electrode terminal 30B so as to be integrated therewith.

The structure of the solid-state battery in the present description may be a structure in which a section in a sectional view direction is cut out by an ion milling apparatus (model number IM4000PLUS manufactured by Hitachi High-Technologies Corporation) and observed from an image acquired using a scanning electron microscope (SEM) (model number SU-8040 manufactured by Hitachi High-Technologies Corporation). In addition, the curvature radius R, the taper angle, and the dimension ratio in the tapered shape as described in the present description may refer to values calculated from dimensions measured from an image acquired by the above method.

The solid-state battery according to the present invention is a laminated solid battery formed by laminating each of layers constituting a battery constituent unit, and can be produced by a printing method such as a screen printing method, a green sheet method using a green sheet, or a composite method thereof. Therefore, each of a layer constituting the battery constituent unit comprises a sintered body. Preferably, each of the positive electrode layer, the negative electrode layer, and the solid electrolyte layer is integrally sintered with each other. That is, it can be said that the solid battery laminate forms a fired integrated product. In such a fired integrated product, at least one of the electrode layers has a tapered shape in which the dimension decreases toward the side surface in contact with the external terminal.

[Method for Producing Solid-State Battery]

As described above, the solid-state battery of the present invention can be produced by a printing method such as a screen printing method, a green sheet method using a green sheet, or a composite method thereof. Hereinafter, a case of adopting a printing method for understanding the present invention will be described in detail; however, the present invention is not limited to this method.

Step of Forming Solid Battery Laminate Precursor

In the present step, several types of pastes are used as an ink, such as a paste for a positive electrode layer, a paste for a negative electrode layer, a paste for a solid electrolyte layer, a paste for a current collector layer, a paste for an electrode separating unit, and a paste for a protective layer. That is, a paste having a predetermined structure is formed on the support base by applying the paste by a printing method.

In printing, a solid battery laminate precursor corresponding to a predetermined solid-state battery structure can be formed on a substrate by sequentially laminating printing layers with a predetermined thickness and pattern shape. The type of the pattern forming method is not particularly limited as long as it is a method capable of forming a predetermined pattern, and is, for example, any one or two or more of a screen printing method and a gravure printing method.

The paste can be prepared by wet-mixing a predetermined constituent material of each layer appropriately selected from the group consisting of a positive electrode active material, a negative electrode active material, a conductive auxiliary agent, a solid electrolyte material, a current collector layer material, an insulating material, a binder, and a sintering aid, with an organic vehicle in which an organic material is dissolved in a solvent. The paste for the positive electrode layer includes, for example, a positive electrode active material, a conductive auxiliary agent, a solid electrolyte material, a binder, a sintering aid, an organic material, and a solvent. The paste for the negative electrode layer includes, for example, a negative electrode active material, a conductive auxiliary agent, a solid electrolyte material, a binder, a sintering aid, an organic material, and a solvent. The paste for the solid electrolyte layer includes, for example, a solid electrolyte material, a binder, a sintering aid, an organic material, and a solvent. The paste for the positive electrode current collector layer and the paste for the negative electrode current collector layer include a conductive auxiliary agent, a binder, a sintering aid, an organic material, and a solvent. The paste for the protective layer includes, for example, an insulating material, a binder, an organic material, and a solvent. The paste for the insulating layer includes, for example, an insulating material, a binder, an organic material, and a solvent.

The organic material included in the paste is not particularly limited, and there can be used at least one polymer material selected from the group consisting of a polyvinyl acetal resin, a cellulose resin, a polyacrylic resin, a polyurethane resin, a polyvinyl acetate resin, and a polyvinyl alcohol resin. The type of the solvent is not particularly limited, and is, for example, any one or two or more of organic solvents such as butyl acetate, N-methyl-pyrrolidone, toluene, terpineol, and N-methyl-pyrrolidone.

In the wet-mixing, a medium can be used, and specifically, for example, a ball mill method and a viscomill method can be used. Whereas, a wet-mixing method without using a medium may be used, and for example, a sand mill method, a high-pressure homogenizer method, and a kneader dispersion method can be used.

The support base is not particularly limited as long as it is a support capable of supporting each paste layer, and is, for example, a release film having one surface subjected to a release treatment. Specifically, there can be used a substrate composed of a polymer material such as polyethylene terephthalate. When each paste layer is subjected to the firing step while being held on the substrate, a substrate having heat resistance against a firing temperature may be used.

In printing, an unfired laminate corresponding to a predetermined solid-state battery structure can be formed on a substrate by sequentially laminating printing layers with a predetermined thickness and pattern shape. When each printed layer is formed, a drying treatment is performed. In the drying treatment, the solvent is evaporated from the unfired laminate. The unfired laminate is formed, and then the unfired laminate may be peeled off from the substrate and subjected to the firing step, or the unfired laminate may be subjected to the firing step while being held on the support substrate.

Firing Step

In the firing step, the solid battery laminate precursor is subjected to firing. Although it is merely an example, the firing is performed by removing the organic material in a nitrogen gas atmosphere containing oxygen gas or in the atmosphere, for example, at 500° C., and then by heating the solid battery laminate precursor in a nitrogen gas atmosphere or in the atmosphere, for example, at 550° C. to 5000° C. The firing may be performed while pressurizing the solid battery laminate precursor in the lamination direction (in some cases, the lamination direction and a direction perpendicular to the lamination direction).

Undergoing such firing forms a solid battery laminate, and a desired solid-state battery is finally obtained.

Preparation of Characteristic Part in the Present Invention

The tapered shape of the electrode layer of the solid-state battery of the present invention may be formed by any method as long as the electrode layer is reduced in dimension toward the side surface in contact with the external terminal in a plan view of the solid-state battery. As an example, using screen printing for example, the electrode layer precursor of the unfired laminate may be pattern-printed so that the dimension decreases toward the side surface in contact with the external terminal (for example, in an arcuate or linear tapering manner). When such an electrode layer precursor is fired, there can be obtained a solid-state battery having a desired battery constituent unit comprising an electrode layer having a through opening.

Hereinafter, a method for producing a solid-state battery will be described in detail based on the exemplary aspects shown in FIGS. 7(A) to (F).

Step of Forming Solid Battery Laminate

Figure 7A:
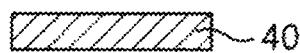
FIGS. 7(A) to 7(F) are schematic views (a sectional view (left view) and a plan view (right view)) for explaining the method for producing the solid-state battery according to one embodiment of the present invention.
Figure 7A:
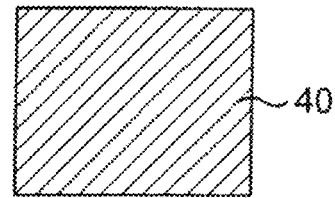

A protective solid electrolyte, a solvent, and, as necessary, a protective binder for example are mixed to prepare a protective paste. Alternatively, a protective solid electrolyte, a solvent, an insulating material, and, as necessary, a protective binder for example are mixed to prepare a protective paste. Subsequently, as shown in FIG. 7(A), a protective paste is applied to one surface of a substrate (not shown) to form protective layer 40.

Figure 7B:
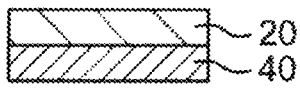
Figure 7B:
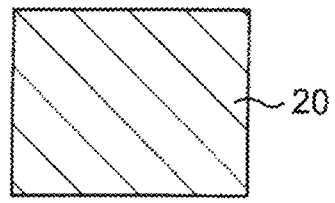

Then, a solid electrolyte, a solvent, and, as necessary, an electrolyte binder for example are mixed to prepare a paste for a solid electrolyte layer. Subsequently, as shown in FIG. 7(B), a paste for a solid electrolyte layer is applied to one surface of protective layer 40 to form paste solid electrolyte layer 20.

Figure 7C:
Figure 7C:
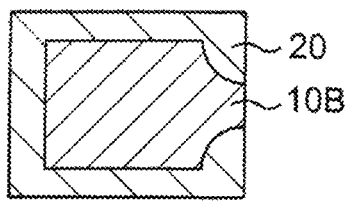

Then, a negative electrode active material, a solvent, and, as necessary, a negative electrode active material binder for example are mixed to prepare a negative electrode paste. Subsequently, as shown in FIG. 7(C), using a pattern forming method, a negative electrode paste is applied to the surface of solid electrolyte layer 20 whereby paste negative electrode layer 10B is formed. In this case, negative electrode layer 10B is formed so that the dimension decreases toward one side of the outer edge of solid electrolyte layer 20 (for example, in an arcuate tapering manner as illustrated in FIG. 7(C)). Negative electrode layer 10B is formed so as to extend to the one side of the outer edge of solid electrolyte layer 20, and is formed so as not to extend to the other three sides of the outer edge of solid electrolyte layer 20.

Figure 7D:
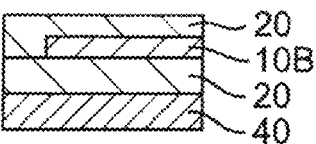
Figure 7D:
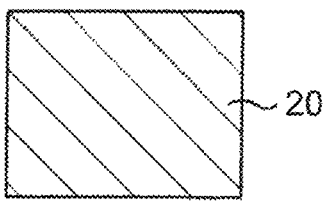

Then, as shown in FIG. 7(D), a paste for the solid electrolyte layer is applied so as to be filled in a space between negative electrode layer 10B and the outer edge of solid electrolyte layer 20. A paste for the solid electrolyte layer is further applied to one surface thereof to be formed into paste solid electrolyte layer 20.

Figure 7E:
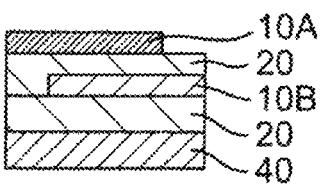
Figure 7E:
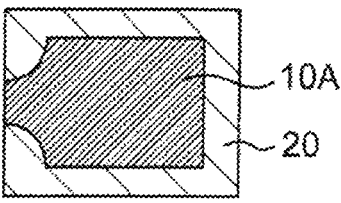

Then, a positive electrode active material, a solvent, and, as necessary, a positive electrode active material binder for example are mixed to prepare a positive electrode paste. Subsequently, as shown in FIG. 7(E), using a pattern forming method, a positive electrode paste is applied to the surface of solid electrolyte layer 20 whereby paste positive electrode layer 10A is formed. In this case, at the outer edge of solid electrolyte layer 20, paste positive electrode layer 10A is formed so that the dimension decreases toward one side opposite to one side where negative electrode layer 10B extends (for example, in an arcuate tapering manner as illustrated in FIG. 7(E)). Paste positive electrode layer 10A is formed so as to extend to the one side of the outer edge of solid electrolyte layer 20, and is formed so as not to extend to the other three sides of the outer edge of solid electrolyte layer 20.

Figure 7F:
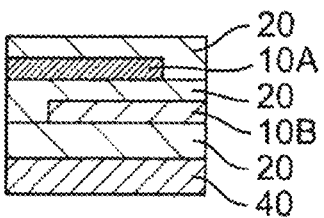
Figure 7F:
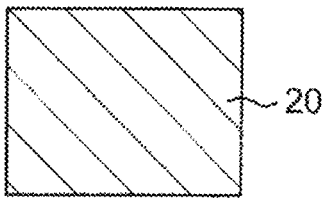

Then, as shown in FIG. 7(F), a paste for the solid electrolyte layer is applied so as to be filled in a space between positive electrode layer 10A and the outer edge of solid electrolyte layer 20. A paste for the solid electrolyte layer is further applied to one surface thereof to be formed into paste solid electrolyte layer 20.

Then, protective layer 40 is formed on solid electrolyte layer 20 in the same manner as the procedure for forming protective layer 40. Thereby, a solid battery laminate precursor is formed.

Finally, the solid battery laminate precursor is heated. In this case, the heating temperature is set so that a series of layers constituting the solid battery laminate precursor is sintered. Other conditions such as heating time can be arbitrarily set.

This heat treatment sinters a series of layers constituting the solid battery laminate precursor, and thus the series of layers is thermocompressed. Therefore, solid battery laminate 500' is formed.

Step of Forming Positive Electrode Terminal and Negative Electrode Terminal

A positive electrode terminal is bonded to a solid laminate by using, for example, a conductive adhesive, and a negative electrode terminal is bonded to the solid laminate by using, for example, the conductive adhesive. Thereby, each of the positive electrode terminal and the negative electrode terminal is attached to the solid laminate, and thus a solid-state battery is completed.

The embodiments of the present invention have been described above; however, only typical examples have been illustrated. Therefore, those skilled in the art will easily understand that the present invention is not limited thereto, and various aspects are conceivable without changing the gist of the present invention.

For example, in the above explanation, the solid-state battery exemplified in, for example, FIG. 1 has been mainly described; however, the present invention is not necessarily limited thereto. The present invention is similarly applicable to any solid-state battery as long as the solid-state battery has the positive electrode layer, the negative electrode layer, and the solid electrolyte layer, and at least one of the electrode layers has a tapered shape in which the dimension decreases toward a side surface in contact with the external terminal in a plan view of the solid-state battery.

The solid-state battery of the present invention can be used in various fields where electric storage is assumed. Although it is merely an example, the solid-state battery of the present invention can be used: in the fields of electricity, information, and communication (mobile device fields such as mobile phones, smartphones, laptops, digital cameras, activity meters, arm computers, and electronic paper); in home and small industrial applications (for example, the fields of electric tools, golf carts, and home, nursing, and industrial robots); in large industrial applications (for example, the fields of forklift, elevator, and harbor crane); in transportation system fields (for example, the field of hybrid vehicles, electric vehicles, buses, trains, power-assisted bicycles, and electric two-wheeled vehicles); in power system applications (for example, the fields of various types of power generation, road conditioners, smart grids, and household power storage systems); in medical applications (medical equipment fields such as earphone hearing aids); in pharmaceutical applications (for example, the field of dosage management systems); and IoT fields and space and deep sea applications (for example, the fields of a space probe and a submersible.).

DESCRIPTION OF REFERENCE SYMBOLS

10: Electrode layer
10A: Positive electrode layer
11A: Positive electrode tapered portion
12A: Positive electrode non-tapered portion
10B: Negative electrode layer
11B: Negative electrode tapered portion
12B: Negative electrode non-tapered portion
20: Solid electrolyte layer
30: External terminal
30A: Positive electrode terminal
30B: Negative electrode terminal
30': External terminal material
40: Protective layer
500': Solid battery laminate
500'A: Positive electrode side end surface b
500'B: Negative electrode side end surface
500: Solid-state battery

The invention claimed is:
1. A solid-state battery, comprising:
a solid battery laminate including at least one battery constituent unit including a positive electrode layer, a negative electrode layer, and a solid electrolyte layer interposed between the positive electrode layer and the negative electrode layer along a lamination direction;
a positive electrode terminal on a first side surface of the solid battery laminate, and the positive electrode layer is in electrical contact with the positive electrode terminal at the first side surface; and
a negative electrode terminal on a second side surface of the solid battery laminate, and the negative electrode layer is in electrical contact with the negative electrode terminal at the second side surface,
wherein, in a plan view of the solid-state battery, at least one of the positive electrode layer and the negative electrode layer has a tapered portion wherein a dimension thereof decreases toward the first side surface or the second side surface, respectively, so as to define a contact portion between the positive electrode layer and the positive electrode terminal and/or between the negative electrode layer and the negative electrode terminal, and an end surface of the contact portion is in electrical contact with the positive electrode terminal and/or the negative electrode terminal, and
a surface defining where the end surface of the contact portion is in electrical contact with the positive elec- trode terminal and/or the negative electrode terminal is the same as a surface where the solid electrolyte layer contacts the positive electrode terminal and/or the negative electrode terminal.

2. The solid-state battery according to claim 1, wherein, in the plan view, a separation distance between a corner portion of the solid battery laminate and the at least one of the positive electrode layer and the negative electrode layer is relatively large as compared to an electrode layer that has a substantially rectangular shape.

3. The solid-state battery according to claim 1, wherein, in the plan view, the contact portion between the positive electrode layer and the positive electrode terminal and/or between the negative electrode layer and the negative electrode terminal is relatively small as compared with an electrode layer having a substantially rectangular shape.

4. The solid-state battery according to claim 1, wherein the tapered portion has a tapered shape that is curved.

5. The solid-state battery according to claim 4, wherein the tapered shape has an arc shape curved inward.

6. The solid-state battery according to claim 5, wherein a radius of curvature of the tapered arc shape curved inward is 25 μm to 10000 μm.

7. The solid-state battery according to claim 4, wherein the tapered shape has an arc shape curved outward.

8. The solid-state battery according to claim 1, wherein the tapered portion has a tapered shape that is linear.

9. The solid-state battery according to claim 8, wherein a taper angle of the tapered shape is 40 degrees to 80 degrees.

10. The solid-state battery according to claim 1, wherein in the at least one of the positive electrode layer and the negative electrode layer, a contour between the tapered portion and a non-tapered main surface portion of the at least one of the positive electrode layer and the negative electrode layer is rounded.

11. The solid-state battery according to claim 1, further comprising a same material as that of the positive external terminal and/or the negative electrode terminal between the tapered portion of the at least one of the positive electrode layer and the negative electrode layer and the respective positive electrode terminal or the negative electrode terminal.

12. The solid-state battery according to claim 1, wherein, in a sectional view of the solid-state battery, at least a part of the tapered portion in the at least one of the positive electrode layer and the negative electrode layer is a non-opposing portion that does not directly oppose an adjacent different polarity electrode layer in the lamination direction.

13. The solid-state battery according to claim 1, wherein the positive electrode layer and the negative electrode layer are layers capable of occluding and releasing lithium ions.

14. The solid-state battery according to claim 1, wherein a ratio of a length of the tapered portion to a length of a non-tapered main surface portion in the plan view is 0.01 to 1.0.

15. The solid-state battery according to claim 1, wherein the non-tapered main surface portion of each of the positive and negative electrode layers has a substantially rectangular shape in the plan view.

16. The solid-state battery according to claim 1, wherein, in the plan view, a dimensional ratio of a width dimension of the contact portion between the positive electrode layer and the positive electrode terminal and/or between the negative electrode layer and the negative electrode terminal to a width dimension of a non-tapered main surface portion of the respective positive electrode terminal and/or the negative electrode terminal is 0.3 to 0.9.

17. The solid-state battery according to claim 1, wherein both the positive electrode layer and the negative electrode layer include the tapered portion.

* * * * *